(No Model.) 5 Sheets—Sheet 1.
B. R. BOND.
CLOTH MEASURING MACHINE.

No. 410,485. Patented Sept. 3, 1889.

(No Model.) 5 Sheets—Sheet 3.

B. R. BOND.
CLOTH MEASURING MACHINE.

No. 410,485. Patented Sept. 3, 1889.

Witnesses
J. A. Rutherford
Dennis Lumby

Inventor:
Benjamin Robert Bond
By James L. Norris.
Attorney.

(No Model.) 5 Sheets—Sheet 4.

B. R. BOND.
CLOTH MEASURING MACHINE.

No. 410,485. Patented Sept. 3, 1889.

Witnesses:
J. A. Rutherford
Dennis Sumby

Inventor:
Benjamin Robert Bond
By James L. Norris Atty (No Model.) 5 Sheets—Sheet 5.

B. R. BOND.
CLOTH MEASURING MACHINE.

No. 410,485. Patented Sept. 3, 1889.

UNITED STATES PATENT OFFICE.

BENJAMIN ROBERT BOND, OF LONDON, ENGLAND.

CLOTH-MEASURING MACHINE.

SPECIFICATION forming part of Letters Patent No. 410,485, dated September 3, 1889.

Application filed March 11, 1889. Serial No. 302,802. (No model.) Patented in England October 16, 1888, No. 14,868.

*To all whom it may concern:*

Be it known that I, BENJAMIN ROBERT BOND, draper, a subject of the Queen of Great Britain, residing at 21 Junction Road, Upper Halloway, London, England, have invented certain new and useful Improvements in Cloth Measuring and Winding Machines, (for which I have obtained a patent in Great Britain, No. 14,868, dated October 16, 1888,) of which the following is a specification.

This invention has for its object to provide novel, simple, and economical mechanism for measuring and winding cloth, carpet, and analogous material; and the invention consists in the features of construction and combination of devices hereinafter described and claimed, reference being made to the accompanying drawings, in which—

Figure 1:
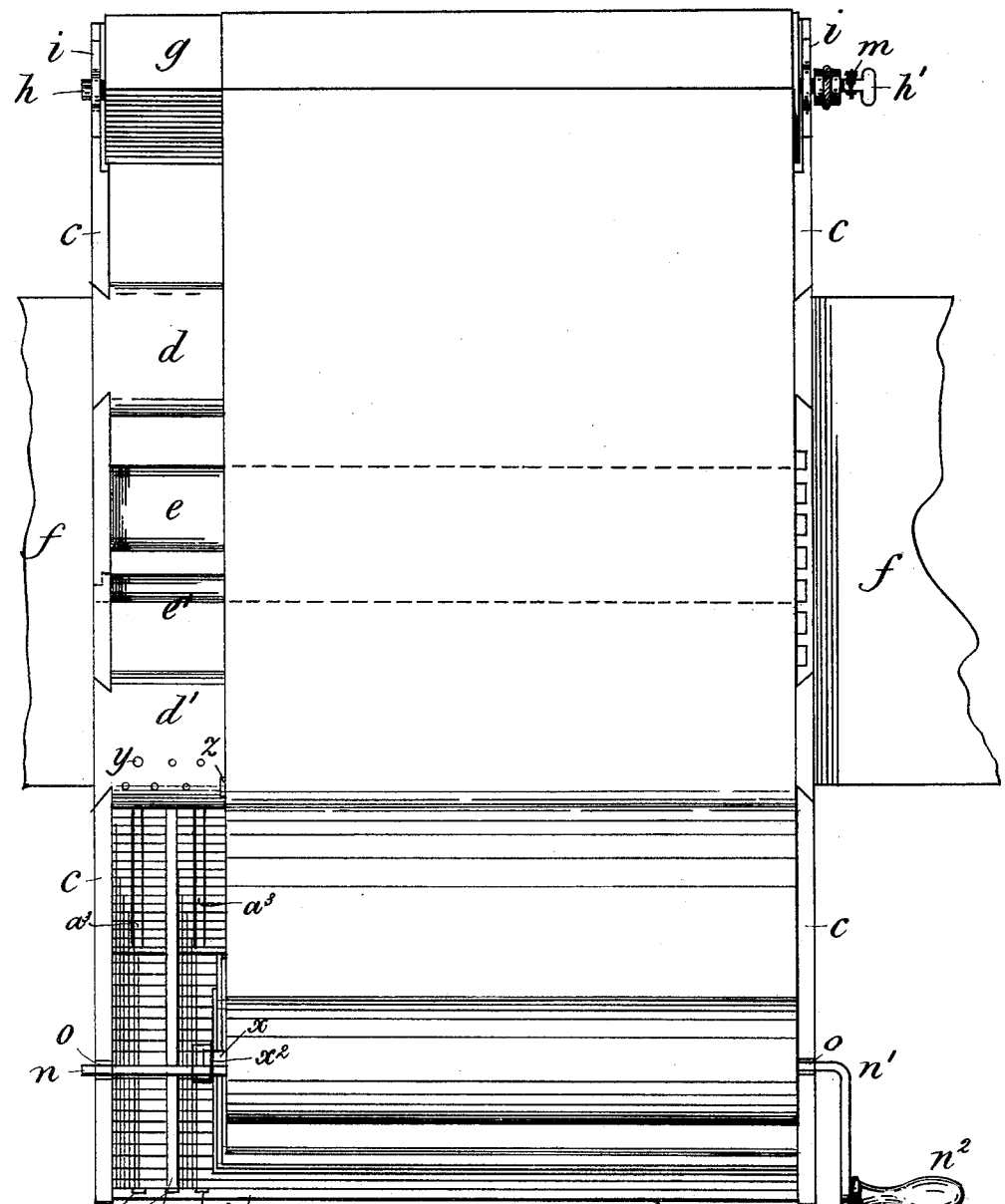
Figure 2:
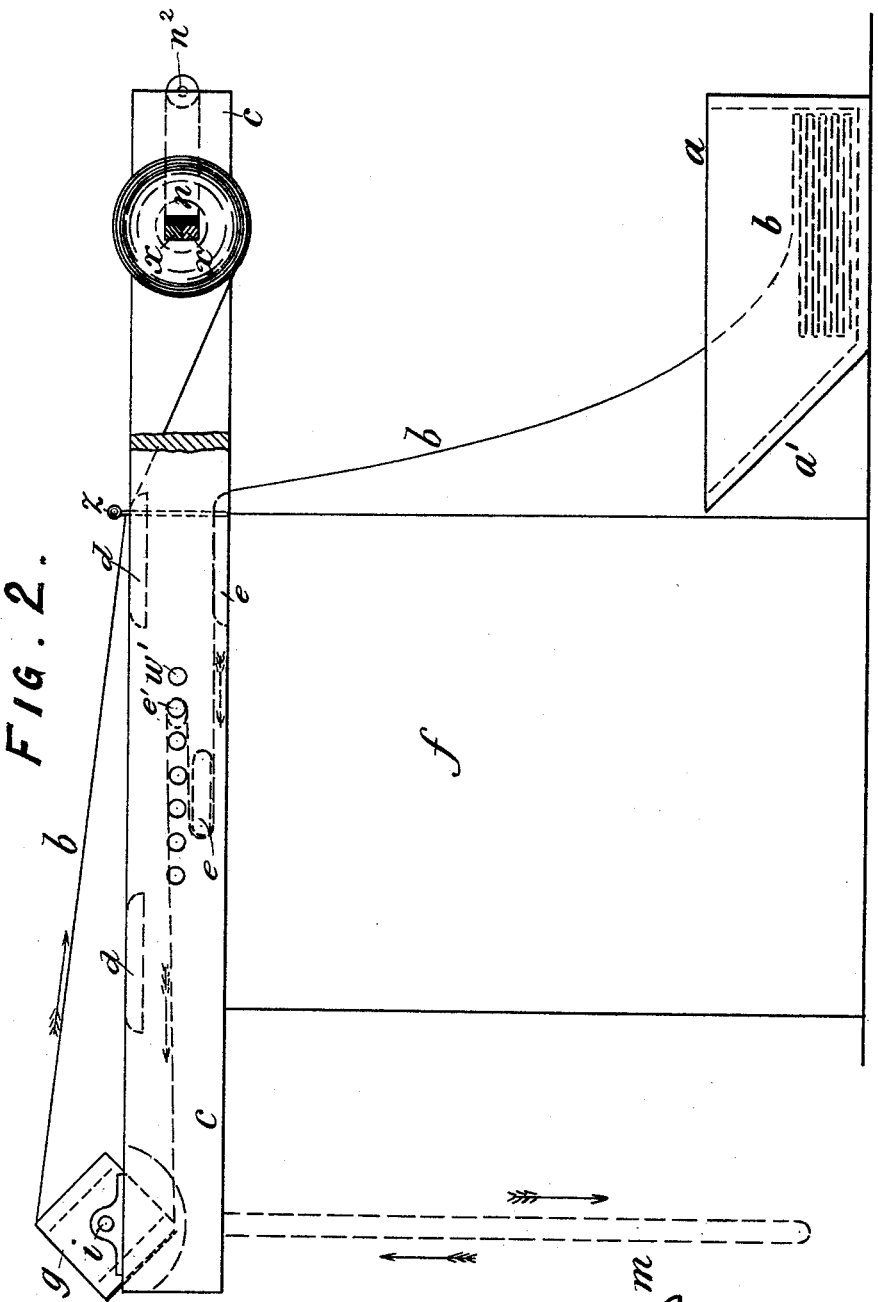
Figure 3:
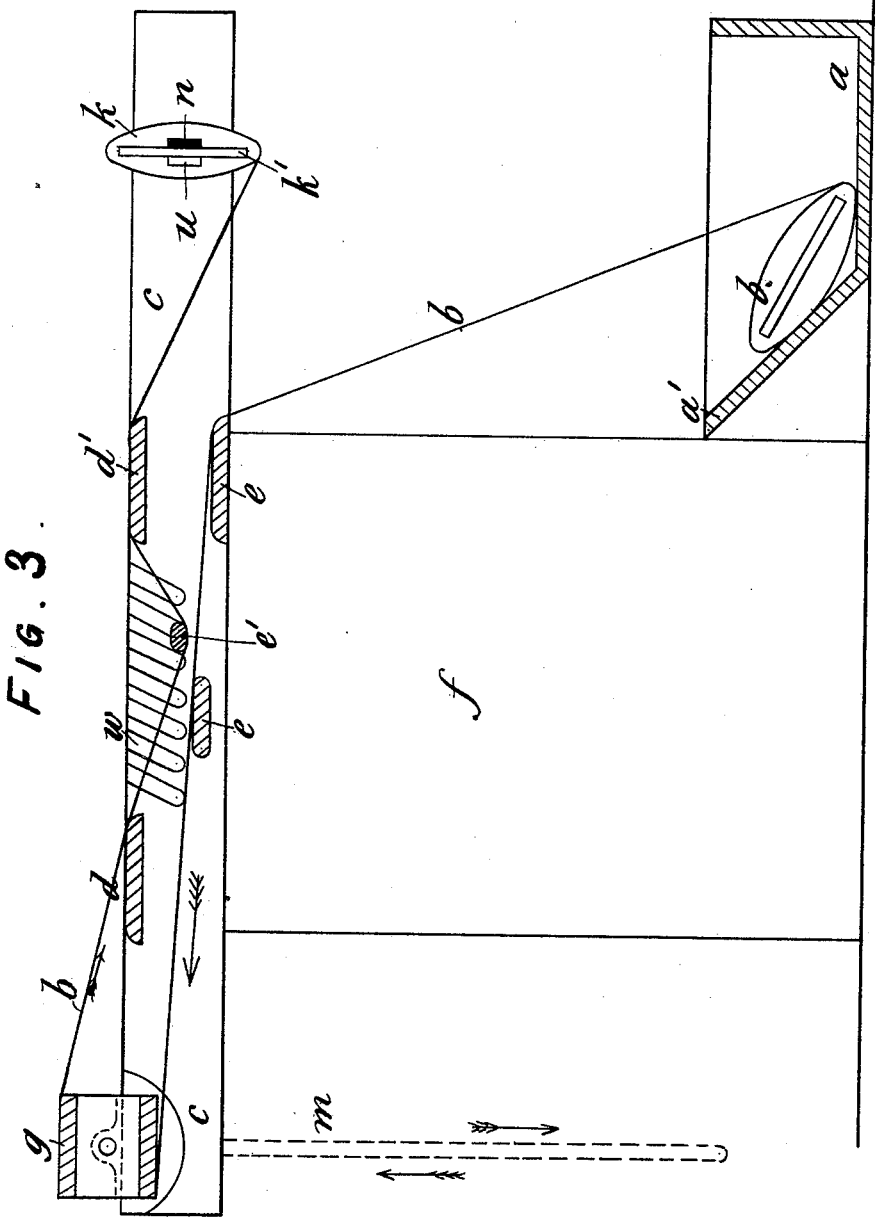

Figure 1 is a top plan view of a cloth measuring and winding machine embodying my invention. Fig. 2 is a broken side elevation of the same; Fig. 3, a longitudinal sectional view showing a modification. Figs. 4 to 16, inclusive, are detail views of parts hereinafter fully explained.

In order to enable those skilled in the art to make and use my invention, I will now describe the same in detail, referring to the drawings, wherein—

The letter $a$ indicates a cloth-roll-holding box placed on the floor at the front of the machine-frame, and in which is placed the cloth-roll to be unboarded, measured, and wound into rolls, either for immediate sale or for storage in a warehouse. The box is provided with an inclined flat rear wall $a'$, arranged at an obtuse angle to its flat bottom, and within the box is a partition $a^2$, that can be adjusted into different positions along the length of the box to adapt the latter to the length of the cloth-roll, and consequently to the width of the cloth. The box is here shown as provided with several sets or grooves $a^3$, so that the partition can be slid out of one set and inserted into another set, for the purpose of adjusting such partition for the purpose stated; but I do not confine myself to any special means of adjustment, as various contrivances can be resorted to for accomplishing that object. The arrangement of the flat rear wall $a'$ at an obtuse angle to the flat bottom of the box is important, for by this particular construction the cloth-roll, taking the position shown in Fig. 1, rests in an inclined position partly on the flat bottom and partly on the flat inclined rear wall, and thereby enables the cloth to unroll with a constant and unvarying tension.

The machine-frame may be supported by a counter $f$, and comprises two parallel side bars $c\,c$, united by four transverse cloth-supporting guide-boards $d\ d'\ e\ e$, the two former being placed in a plane above the two latter, and each having rounded edges to avoid damaging the traveling cloth. A polygonal cloth-measuring frame or box $g$ rotates with an axle $h$, journaled in bearings $i$ at one end of the side bars $c$, such box or frame being constructed so that the total extent of its four (more or less) sides equals a definite measure of length— say, for example, a meter or yard, or any other convenient measure.

The axle $h$ is provided at one end with a longitudinal extension $h'$ for carrying an endless measuring-chain $m$ in such manner that two or more links of the chain pass over the extension during each revolution of the measuring frame or box, and the chain has a definite number of links, one or more of which is or are so formed or marked as to distinguish the same, so that it or they can be watched as the chain travels around the extension, so that each arrival of the marked link or links at a certain point indicates a certain measure of cloth. The extension $h'$ is provided with a screw-socket $h^2$, by which to screw it on the axle $h$, and the extension is flat, as in Figs. 12 and 13, in order that two links only of the chain pass over the extension at each revolution of the measuring frame or box $g$. The extension can obviously be applied to the axle $h$ by means other than the screw-socket.

Figure 4:
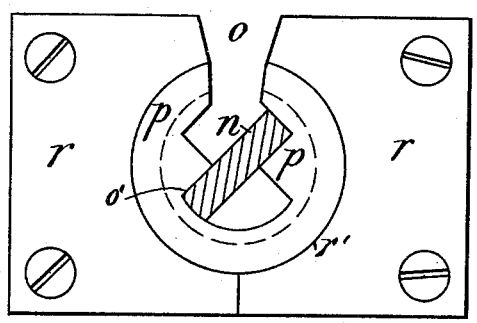
Figure 5:
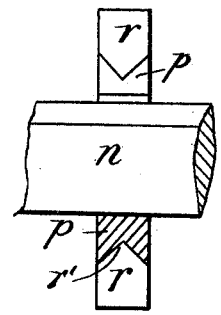
Figure 6:
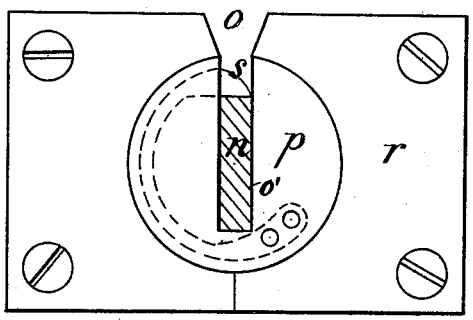
Figure 7:
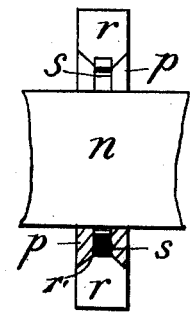
Figure 8:
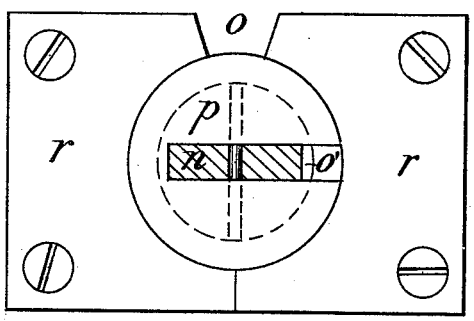
Figure 9:
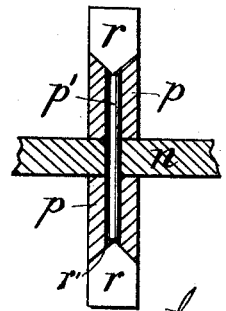
Figure 10:
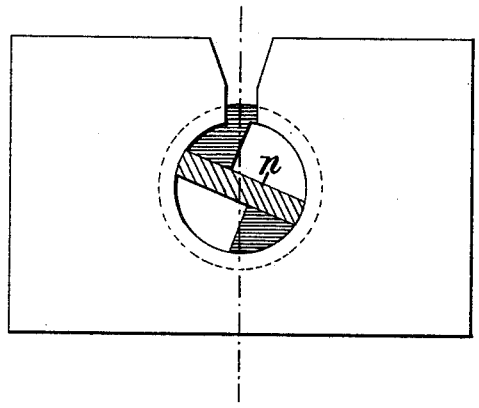
Figure 11:
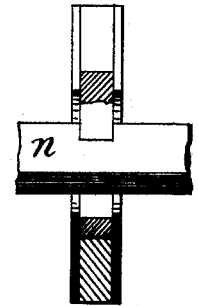
Figure 12:
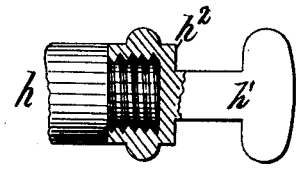
Figure 13:
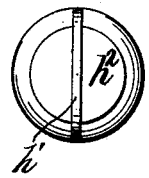
Figure 14:
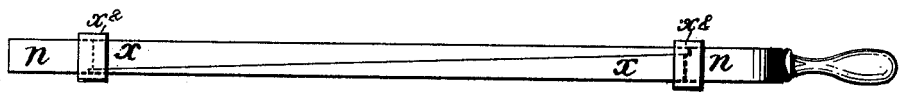
Figure 15:
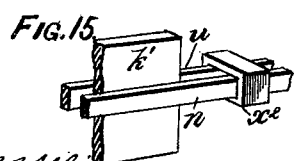
Figure 16:

The revolving axle $n$ for the winding-board $k'$ is composed of a flat bar of metal or other suitable material, and its end portions are supported in bearings, each of which comprises a plate made in two sections or parts $r\ r$, Figs. 4, 6, and 8, to be screwed or otherwise secured in a fixed position to or in one of the side bars $c$.

The plate-bearing is provided with a circular opening to form a circular seat $r'$, that communicates with a slot $o$ in the top of the plate, and in the seat $r'$ of each plate is arranged a disk $p$, adapted to revolve and provided with a diametrical recess or slot $o'$, into which the flat axle $n$ can be inserted. The axle $n$ may abut shoulders in the revolving disk $p$, as in Figs. 4, 5, 10, and 11, or said axle can be engaged and held by a segmental spring $s$, secured at one end to the disk and haxing its other and free end hooked over the axle, as in Figs. 6 and 7; or the axle may be held by a pin $p'$, as in Figs. 8 and 9. The axle $n$ is readily detachable and is provided at one end with a crank $n'$ and handle $n^2$, and the revolution of the axle revolves the disks, whereby the axle has a steady and efficient rotary support.

As shown in Fig. 2, the cloth passes from the roll-carrying box $a$ over one of the supporting guide-boards $e$, under and over the other supporting guide-board $e$, around a tension-bar $e'$, supported in sockets $w'$ of the side bars $c$, and thence the cloth passes under and over the measuring frame or box $g$ to the winding-axle $n$, such cloth bearing upon the cloth-supporting guide-board $d'$. The flat or rectangular axle $n$ is provided with a pair of square clamp-sleeves $x^2$, Figs. 14 and 16, that are adapted to slide along the length of the axle to slip over the ends of the duplicate wedges $xx$, Figs. 1, 2, and 14, or over the ends of the bar $u$, Figs. 3 and 15, according to whether the cloth is to be wound into the form of a cylinder, as at Fig. 2, for immediate sale or is to be wound on a board into oblong form, as at $k$, Fig. 3, for storage in the warehouse. If the cylinder form of roll is desired, the two wedges $x\ x$ are laid along the flat side of the axle $n$, and the clamp-sleeves $x^2$ are then slipped over the ends of the wedges to clamp them on the axle, the end of the cloth having been previously wrapped around the axle or placed between the latter and the wedges. These devices cause the cloth to be evenly and uniformly rolled into a cylinder from the beginning and avoid damaging the first few yards of the cloth, as will occur if the latter be wound on a tapering mandrel or spindle. When the winding or rolling of the cloth-cylinder is completed, the axle $n$ is removed from its rotary plate-bearings, the clamp-wedges are slid off the wedges, and the latter are moved lengthwise in opposite directions, which can obviously be easily effected, thus permitting the axle to be withdrawn and replaced in its rotary plate-bearings. If the cloth is to be warehoused, it is wound on the board $k'$, and to accomplish this the said board is placed between the axle $n$ and a flat bar $u$, Figs. 3 and 15, and the clamp-sleeves $x^2$ on the axle are slipped over the ends of the bar to clamp the board in place. It will thus be seen that the wedges $x\ x$ are interchangeable with the bar $u$ and board, and that the clamp-sleeves permit the use of either the wedges or the bar and board on the axle $n$, which latter is independent of or separate from the parts named.

I am aware that a board has been clamped in place to an axle, and such I do not broadly claim.

I am also aware that cloth has been wound on two counterpart wedges that can be removed lengthwise in opposite directions, and neither do I broadly claim such wedges. I am not aware, however, that a continuous and removable and replaceable flat axle has been provided with two wedges laid upon, supported by, and clamped to the continuous axle, nor am I aware that the interchangeable wedges and bar and board have been used with a continuous flat axle having sliding clamps.

In Fig. 2 the sockets $w'$ for the adjustable tension-bar $e'$ are arranged in a horizontal line, while in Fig. 3 the sockets $w$ are formed as grooves open at their upper ends, so that the tension-bar $e'$ can be inserted into any of them and rise and fall, its weight affording the necessary tension. In Fig. 2 the slack of the cloth is taken up, moving the bar $e'$ along the side bars $c$.

The board $d'$, Figs. 1 and 2, may be provided with a series of holes $y$ to receive the pins $z$ for guiding the cloth in its passage to the continuous axle for winding the cloth.

Having thus described my invention, what I claim is—

1. A cloth measuring and winding machine consisting of a cloth-roll box, side bars connected by an upper pair and a lower pair of transverse cloth-supporting boards, a polygonal measuring frame or box having an axle provided with a flattened extension, and a measuring-chain passing around and moved by such flattened extension, substantially as described.

2. A cloth measuring and winding machine consisting of side bars, upper and lower cloth-supporting boards connecting the side bars, a polygonal measuring-frame having an axle provided with a flat extension, and the measuring-chain passing around and moved by the flat extension, substantially as described.

3. A cloth measuring and winding machine consisting of the side bars $c$, having upper and lower cloth-supporting guide-boards $d\ d'$ and $e\ e$, a tension-bar $e'$, adjustable along the length of the side bars between the upper and lower guide-boards, a polygonal measuring-frame $g$, and the winding-axle $n$, substantially as described.

4. A cloth measuring and winding machine consisting of the cloth-roll box $a$, the side bars $c$, having upper and lower transverse cloth-supporting guide-boards $d\ d'$ and $e\ e$ and a series of sockets between the upper and lower guide-boards, a tension-bar $e'$, capable of adjustment to any of the sockets, a polygonal measuring frame or box $g$, having an axle provided with an extension $h'$, the measuring-chain $m$ on the extension, and the winding-axle $n$, substantially as described.

5. The combination, with the flattened continuous axle $n$, provided with two sliding clamps $x^2$, of the two wedges $x$, laid lengthwise on the flattened axle and clamped at their ends thereupon by the sliding clamps, substantially as described.

6. The combination, with the side bars $c$ and the flattened axle $n$, journaled in the side bars and continuous from one to the other of said bars, of two wedges $x$, extending along and supported by the flattened axle, and means for detachably clamping the ends of the wedges upon the axle, substantially as described.

7. The combination, with the frame $c$ and measuring-box $g$, of the flat winding-axle $n$ and bearings for the ends of the axle, each bearing consisting of a sectional plate $r\ r$, having a slot $o$ and a circular seat $r'$, and a disk $p$, fitted to and revolving on said circular seat and provided with a diametrical recess or slot $o'$, receiving the flat axle, substantially as described.

8. The combination, in a cloth-measuring machine, of the side bars $c$, the revolving plate-bearings $p$, mounted in said side bars and having slots $o'$, and the flattened winding-axle $n$, having clamps $x^2$, slidable along the axle, substantially as described.

BENJAMIN ROBERT BOND.

Witnesses:
GEORGE C. DOWNING,
  8 *Quality Court, London, W. C.*
WALTER J. SKERTEN,
  17 *Gracechurch Street, London, E. C.*